United States Patent [19]
Hwa et al.

[11] 3,890,228
[45] June 17, 1975

[54] POLYACRYLATE-POLYPHOSPHONIC ACID TREATMENT IN AQUEOUS SYSTEMS

[75] Inventors: Chih Ming Hwa, Palatine; Dionisio Guerrero Cuisia, Chicago, both of Ill.; John Allen Gray, Toronto, Canada

[73] Assignee: Chemed Corporation, Cincinnati, Ohio

[22] Filed: Apr. 13, 1973

[21] Appl. No.: 350,875

[52] U.S. Cl. ................. 210/58; 21/2.7 A; 252/180
[51] Int. Cl.² ............................................ C02B 5/06
[58] Field of Search .............. 210/58; 252/180, 181; 21/2.7 A; 261/DIG. 46

[56] References Cited
UNITED STATES PATENTS

| | | | |
|---|---|---|---|
| 3,214,454 | 10/1965 | Blaser | 252/180 X |
| 3,303,139 | 2/1967 | Blaser | 252/180 |
| 3,514,376 | 5/1970 | Salutsky | 210/58 X |
| 3,617,576 | 11/1971 | Kerst | 210/58 |
| 3,663,448 | 5/1972 | Ralston | 210/58 X |
| 3,699,048 | 10/1972 | Kruger et al. | 210/58 X |
| 3,733,270 | 5/1973 | Kerst | 210/58 |

Primary Examiner—Thomas G. Wyse
Attorney, Agent, or Firm—Eugene M. Bond

[57] ABSTRACT

The invention disclosed relates to the use of combinations of polyacrylates and polymethacrylates with organo-phosphonic acids for the treatment of aqueous systems. The organo-phosphonic acid compounds include alkylene and hydroxy alkylene polyphosphonic acids, and water-soluble salts thereof. The polyacrylic compounds may be polyacrylic acid, polymethacrylic acid, or water-soluble salts thereof.

In the operation of boilers for the production of steam, in the operation of evaporators for the production of distilled water, and in the operation of water cooling equipment for various purposes, deposits of the carbonate, phosphate, or sulfate of calcium, and deposits containing insoluble magnesium salts or iron compounds etc., may be formed due to the chemistry of the water, and the presence of high temperatures on the heat transfer surfaces. The formation of such deposits can be controlled and substantially prevented by the use of the combinations covered by this patent in dosages ranging from fractions of a part per million up to 200 parts per million. The ratio of polymer to phosphonate may vary from about five to one to one to five.

1 Claim, No Drawings

POLYACRYLATE-POLYPHOSPHONIC ACID TREATMENT IN AQUEOUS SYSTEMS

This invention relates to a method and comparison for inhibiting the deposition of scale and sludge on the heat transfer surfaces of boilers and cooling water systems. In boilers, the surfaces of the insoluble scale or sludge which forms from the hardness salts in the water are conditioned by this treatment to prevent adherence to the internal metal surface of the boiler or to each other, and the particle size is thereby maintained sufficiently small to keep the sludge in colloidal suspension for removal by blowdown. Similarly in water cooling systems, particularly in open recirculating systems such as cooling towers, cooling ponds, etc., the tendency of the insoluble salts to nucleate and deposit on heat transfer surfaces is inhibited by the ability of the treatment to adsorb on the crystals as they are formed and prevent further growth or adherence. The metallic heat transfer surfaces themselves are also conditioned by adsorption of the treatment chemicals, thereby further inhibiting the buildup of scale thereon.

The formation of such scale and metallic oxide deposits on heat transfer surfaces is one of the most serious problems connected with the use of heat exchange equipment in utility, power, desalination, and industrial cooling fields. Such deposits are harmful because they lower the heat transfer efficiency of the surface and if sufficiently heavy can cause overheating and damage to the equipment with the possibility of failure.

Water-formed deposits consist of several types, adherent crystalline scale and metal oxide precipitates formed in situ on the internal surfaces, and non-adherent precipitated materials which form in the body of the water and may remain suspended or settle out in areas of low water velocity. The adherent scale is formed by crystallization and other reactions when the scale forming consituents become super-saturated and deposit directly from solution, or by the adherence of the suspended particles in the water due partly to entrapment in the scale as it is forming, and partly to the tendency of these materials to adhere to metallic surfaces. Factors influencing such scale formation include; the inverse solubility of material such as calcium carbonate and calcium sulfate, the tendency of the salt to become super-saturated as the water is evaporated, the chemistry of the water, including solids content, alkalinity, temperature, etc.

Such scale may be controlled by pretreatment to remove scale forming constituents. However, the use of internal treatment is frequently more economical and requires no capital expenditure for equipment that is required for the use of pretreatment methods.

This invention, therefore, refers to the use of specific combinations of water soluble polymers and phosphonates which inhibit and prevent the formation or the deposition of these insoluble materials in the water, in dosages considerably lower than the stoichiometric amounts required to actually chelate the metallic ion. In other words, they exhibit the so called "threshold effect" of the inhibition of crystal formation of metallic salts and the prevention of their adherence to heat transfer surfaces.

An object of the present invention is to provide a method for improved sludge conditions. A further object is to provide a method of inhibiting the deposition of scale on heat transfer surfaces, steam generators, cooling equipment etc., at dosage levels far below the amount required to completely chelate the hardness ions responsible. Another object of the invention is to provide a method for reducing the tendency toward the formation of crystalline sludge in the internal treatment of boilers, evaporators, etc. Another object is to control the formation of foulants in condensers and other heat transfer equipment used in circulating water systems. Still another object of the invention is to improve the properties of the sludge in boilers and other heating equipment so that it can be removed by blowdown procedures. A further object of this invention is to so treat heat transfer surfaces as to prevent scaling and fouling without increasing the corrosion on these surfaces. A final object of this invention is to remove existing deposits from boiler surfaces by a "detergency effect."

The water used as feed water or makeup in boilers, evaporators, cooling systems, contains dissolved salts of calcium and magnesium which can lead to scale and sludge deposits. One of the most common types of such deposits encountered in such systems is calcium carbonate. It results from the breakdown of calcium bicarbonate naturally present in most raw waters. Calcium carbonate has a low solubility and this solubility decreases with increasing temperature.

Another deposit frequently encountered in cooling systems is calcium sulfate. This is frequently formed due to the common practice of using sulfuric acid to control the pH of the water and thereby prevent the deposition of calcium carbonate. While the calcium sulfate is more soluble than the calcium carbonate, it also has an inverse solubility-temperature relationship, and at high temperatures can also be precipated as a scale.

Calcium and magnesium phosphate sludges may also be formed when phosphate based or polyphosphate based treatments are used for corrsion control in cooling systems. These materials are also precipitated as sludges when phosphate treatments are used for the internal control of corrosion and scale in boilers.

Iron containing deposits can result either from iron present in the raw water supply or from iron fromed in situ due to corrosion taking place in the piping of the system.

Chemical treatment of boiler water generally involves the combined use of a precipitating agent and a sludge conditioner to maintain the sludge in fluid form. Precipitating chemicals commonly employed are soda ash or sodium phosphate. Magnesium is usually precipitated as the hydroxide due to the high alkalinity normally used in boiler operation, or may also be precipitated as the silicate. Chemical treatment of cooling water usually consists of the addition of corrosion inhibitors combined with scale control agents, antifoulants, and biocides.

In boilers, a wide variety of materials have been added to boiler water treatments for the purpose of conditioning sludge and preventing the buildup of scale on heat transfer surfaces such as: tannins, lignins, starches, polyelectrolytes, sodium carboxymethylcellulose, etc. In cooling systems, similar materials are frequently used in combination with corrosion inhibitors to keep heat transfer surfaces clean. It has now been found that by the use of the combination of the present invention, there is provided an improved sludge, scale, and fouling control composition which gives greatly improved results compared with previously available materials.

Generally stated, the method of this invention for inhibiting deposits of scale and sludge in boilers and evaporators, and preventing the buildup of deposits of scale, mud, silt, and other foulants in cooling water systems comprises adding the makeup water to the system from 0.1 to 200 parts per million of a mixture of (a) a member selected from the group consisting of acrylic acid polymers, methacrylic acid polymers, acrylic acid-methacrylic acid copolymers, and water-soluble salts of the said polymers, said polymers having a weight average molecular weight of from about 400 to 1,000,000 and preferably from 4,000 to 20,000; (b) a polyphosphonic acid corresponding to one of the following formulas:

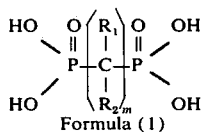
Formula (1)

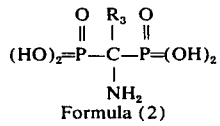
Formula (2)

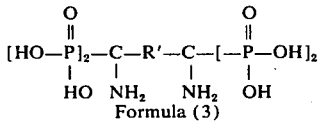
Formula (3)

Wherein $m$ is an integer from 1 to 10, $R_1$ is hydrogen, or an alkyl group having from 1 to 6 carbon atoms and $R_2$ is hydroxyl, hydrogen, or an alkyl group having from 1 to 6 carbon atoms, $R_3$ is an alkyl group having 1 to 10 carbon atoms, benzyl or phenyl, and $R'$ is an alkylene radical having from 1 to 10 carbon atoms; and the water-soluble salts.

The method of this invention comprises adding to the makeup water to the treated system from 0.1 to 200 parts per million, and preferably from 0.2 to 10 parts per million of a mixture of polymethacrylate and hydroxy alkylidene diphosphonic acid components. The preferred polymer is polymethacrylic acid or sodium polymethacrylate having a weight average molecular weight within the range of 4,000 to 20,000. These polymers are commercially available, and methods for their manufacture are well known in the art.

The present composition also includes an organo-phosphonic acid component. The preferred organo-phosphonic acid compound for use in the composition of this invention is a hydroxy alkylidene diphosphonic acid corresponding to formula (1) above, such as those disclosed in U.S. Pat. Nos. 3,214,454 and 3,297,578, the disclosures of which are incorporated herein by reference. Also suitable for use herein is an alkylene diphosphonic acid corresponding to formula (1) such as those disclosed in U.S. Pat. No. 3,303,139, the entire disclosure of which is also incorporated herein by reference. Suitable acids of this type include methylenediphosphonic acid; ethylidenediphosphonic acid; isopropylidenediphosphonic acid; 1-hydroxy, ethylidenediphosphonic acid; hexamethylenediphosphonic acid; trimethylenediphosphonic acid; decamethylenediphosphonic acid; 1-hydroxy, propylidenediphosphonic acid; 1,6-dihydroxy, 1,6-dimethyl, hexamethylenediphosphonic acid; 1,4-dihydroxy, 1,4-diethyl, tetramethylenediphosphonic acid; 1,3-dihydroxy, 1,3-dipropyl, trimethylenediphosphonic acid; 1,4-dibutyl, tetramethylenediphosphonic acid; dihydroxy, diethyl, ethylenediphosphonic acid; 4-hydroxy, 6-ethyl, hexamethylenediphosphonic acid; 1-hydroxy, butylidenediphosphonic acid; butylidenediphosphonic acid; or amino phosphonic acids such as; 1-aminoethane-1, 1-diphosphonic acid; 1-aminopropane-1, 1-diphosphonic acid; 1-aminobenzyl-1, 1-diphosphonic acid; 1,6-diaminohexane-1, 1, 6,6-tetraphosphonic acid; 1-aminoethane-1, 1-diphosphonic acid monoethyl ester, and 1-amino-2-phenylethane-1,1-diphosphonic acid.

The water-soluble salts of these acids include such as the alkali metal, ammonium, amine, or lower alkanolamine salts. Mixtures of the organophosphonic acid compounds described above are also contemplated within the scope of this invention.

Compositions used for treatment of aqueous systems may contain from 1 to 70 percent and preferable from 1 to 10 percent of the combinations disclosed by this invention. These solutions can be made by adding the ingredients to water in any order. These aqueous feed solutions are stable and can be stored prior to use.

In the method of this invention from 0.1 to 200 parts per million of the organo-phosphonic acid compound may be employed. From 0.5 to 200 parts per million of the polyacrylic compound may be employed.

Compositions used in the practice of the present invention may also include other ingredients customarily employed in boiler water or cooling water treatments such as alkalies, lignin derivatives, biocides, corrosion inhibitors, etc. The point in the systems at which the treatment mixtures are added is not critical, however, it is customary to add them to the makeup or fresh water lines through which water enters the system.

The invention is further illustrated by the following specific but non-limiting examples, wherein all parts are given by weight unless otherwise indicated.

EXAMPLE 1

This example demonstrates the system used for determining the synergistic reduction in scaling rates obtained with the compositions of this invention.

Sludge conditioning evaluation was carried out in a small laboratory boiler having three removable electric heating tube surfaces. At the completion of a test, the heating tubes were removed individually from the boiler, the scale or deposit present on 6 inches of the central length of each tube was removed, by scraping, collected in a tared vial and weighed. When scaling tests are run using given feedwater and boiler conditions both without boiler sludge conditioning reagent present in the boiler water and with varying dosages of a given boiler water sludge conditioning reagent, data is obtained as to how well the given reagent or reagents prevent scale deposition and also a comparison of conditioning effectiveness of the subject reagents.

The small laboratory boiler used has been described previously in the proceedings of the Fifteenth Annual Water Conference, Engineers Society of Western Pennsylvania, pages 87–102 (1954). Boiler feedwater was prepared by diluting Lake Zurich, Illinois tap water with distilled water to 40 p.p.m. total hardness as $CaCO_3$, followed by adjustment to a 6 to 1 elemental calcium to magnesium ratio using calcium chloride. The boiler feedwater was fed to the boiler together with chemical treatment solutions containing sodium sulfate, sodium sulfite, sodium hydroxide, sodium chloride, treatment agents consisting of phosphate and sludge conditioning reagents except in blank runs, in a ratio of 3 volumes of feedwater to 1 volume of chemical treatment solution, giving a feedwater total hardness of 30 p.p.m. as $CaCO_3$.

All scaling tests, whether boiler water sludge conditioning reagent was present or absent (blank), were carried out in fixed manner as described following: Boiler blowdown was adjusted to 10% of the boiler feedwater, giving approximately 10 concentrations of the boiler water salines. Using the feedwater described, the composition of the chemical treatment solution was adjusted to give a boiler water (after the 10 concentrations) of the following composition:

TABLE I

| Ingredient | Taken as | Concentration (PPM) |
|---|---|---|
| Sodium Hydroxide | NaOH | 258 |
| Sodium Carbonate | $Na_2CO_3$ | 120 |
| Sodium Chloride | NaCl | 681 |
| Sodium Sulfite | $Na_2SO_3$ | 50 |
| Sodium Sulfate | $Na_2SO_4$ | 819 |
| Silica | $SiO_2$ | less than 1 |
| Iron | Fe | 100 |
| Phosphate | $PO_4$ | 10–20 |

All scaling tests were run for 43 hours each at a boiler pressure of 335 to 400 psig.

EXAMPLES 2–5

Using the procedure of Example 1, a series of runs were performed whereby the boiler water sludge conditioning properties of the synergistic mixture of sodium polymethacrylate and hydroxyethylidene diphosphonic acid are illustrated.

TABLE II

| Ex. Run No. | Additive | Additive Dosage in Boiler Water | Scaling Rate in gram per sq. ft. per hour | % Scale Reduction |
|---|---|---|---|---|
| 2 | Blank | None | 0.275 | 0 |
| 3 | Sodium polymethacrylate having a molecular weight of 9,000 (I) | 30 ppm | 0.183 | 33.2 |
| 4 | Hydroxyethylidene diphosphonic acid (II) | 30 ppm | 0.043 | 84.5 |
| 5 | I + II (1:1 by weight) | 30 ppm | 0.031 | 88.5 |

EXAMPLES 6–9

The boiler feedwater for the subject boiler water sludge conditioning on phosphate cycle was prepared by diluting Lake Zurich, Illinois tap water with distilled water to 60 p.p.m. total hardness as $CaCO_3$, followed by adjustment to a 1.67 to 1 elemental calcium to magnesium ratio using calcium chloride and/or magnesium chloride. This boiler feed was fed to the boilers together with chemical treatment solutions (containing sodium sulfate, sodium sulfite, sodium hydroxide, sodium chloride, treatments agents consisting of phosphate and sludge conditioning reagents except in blank runs) in a ratio of 3 volumes of feedwater to 1 volume of chemical treatment solution, giving a feedwater total hardness of 45 p.p.m. as $CaCO_3$.

Adjustments of boiler water concentrations were carried out in a similar manner as in Example 1. The final boiler water composition after the 10 concentrations was practically the same as in Example 1 except for iron content which was less than 1 p.p.m. as Fe.

All scaling tests were run for 43 hours each at a boiler pressure of 210 to 235 psig.

The boiler water sludge conditioning properties of the synergistic mixture of sodium polymethacrylate and hydroxyethylidene diphosphonic acid are illustrated by the following:

TABLE III

| Ex. Run No. | Additive | Additive Dosage in Boiler Water | Scaling Rate in gram per sq. ft. per hour | % Scale Reduction (Increase) |
|---|---|---|---|---|
| 6 | Blank | None | 0.063 | 0 |
| 7 | Sodium polymethacrylate having a molecular weight of 9,000 (I) | 20 ppm | 0.019 | 69.8 |
| 8 | Hydroxyethylidene diphosphonic acid (II) | 20 ppm | 0.078 | (23.8) |
| 9 | I + II (1:1 by weight) | 20 ppm | 0.014 | 77.8 |

EXAMPLE 10

Evaluation of cooling water treatments has shown that combinations of the components of the subject patent disclosure used in conjunction with conventional corrosion inhibitors such as zinc-organic based formulas, chromates and chromate containing formulas can give improved results not only in the control of scales and deposit buildup, but also unexpected improvement in the control of corrosion. The synthetic water used for these corrosion tests was made up as follows: 100 liters distilled water, 123 grams of magnesium sulfate heptahydrate, 194 grams of calcium sulfate dihydrate, 170.2 grams of sodium metalsilicate, 22.07 grams of sodium chloride, and 32.02 grams of sodium carbonate. The pH of this water is adjusted to about 5.5 with sulfuric acid in order to assure all salts are in solution and then adjusted to a pH of 7.5 with sodium hydroxide to bring it to the proper pH for a cooling water test. The conductivity is about 3,200 micromhos. This is a highly corrosive water, but when treated with a zinc-organic based corrosion inhibitor gives a corrosion rate of about 5 mils per year on a 1010 steel electrode in an instrument for the measurement of corrosion rate by the polarization resistance method. This was a six hour test, and the corrosion rate was still dropping. When the combination of the present invention was added to the corrosion inhibitor formula and fed at the recommended dose level which corresponds to about 1 part per million of phosphonate, and 1 part per million of sodium polymethacrylate, the corrosion rate was reduced to about two and one half mils per year. In order to test the scale control effectiveness of this combination, samples of this water without chemical additive were heated to boiling with a stainless steel immersion heater for one and one half hours at a pH of 8.0. A heavy precipitate formed in the water and there was a buildup of calcium carbonate deposit covering the surface of the heated metal. In the presence of the same dosage of the phosphonate-polymethacrylate combination previously mentioned, there was almost no precipitation, and the surface of the heater remained clean.

Obviously, many modifications and variations of the invention as hereinbefore set forth can be made without departing from the essence and scope thereof, and only such limitations should be applied as are indicated in the appended claims.

What is claimed is:

1. A method for inhibiting deposits of scale, sludge and other foulants in aqueous systems comprises adding to the said system from 0.1 to 200 parts per million of a 1:1 mixture of sodium polymethacrylate having a molecular weight of 9,000 and hydroxyethylidene diphosphonic acid.

* * * * *